United States Patent
Bauer et al.

(10) Patent No.: US 9,986,037 B2
(45) Date of Patent: May 29, 2018

(54) METHOD AND AIRCRAFT SERVER SYSTEM FOR COMMUNICATION WITH A PERSONAL ELECTRONIC DEVICE IN AN AIRCRAFT

(71) Applicant: AIRBUS Operations GmbH, Hamburg (DE)

(72) Inventors: Hans-Achim Bauer, Hamburg (DE); André Zybala, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 218 days.

(21) Appl. No.: 14/521,857

(22) Filed: Oct. 23, 2014

(65) Prior Publication Data
US 2015/0126177 A1   May 7, 2015

(30) Foreign Application Priority Data
Oct. 28, 2013  (EP) .................................. 13190512

(51) Int. Cl.
| | |
|---|---|
| H04M 3/00 | (2006.01) |
| H04L 29/08 | (2006.01) |
| H04W 4/00 | (2018.01) |
| H04M 1/725 | (2006.01) |

(52) U.S. Cl.
CPC ...... H04L 67/125 (2013.01); H04M 1/72569 (2013.01); H04W 4/008 (2013.01)

(58) Field of Classification Search
CPC .. H04L 67/125; H04M 1/72569; H04W 4/008
USPC ....................................................... 455/420
See application file for complete search history.

(56) References Cited

U.S. PATENT DOCUMENTS

| | | | | |
|---|---|---|---|---|
| 5,970,395 | A * | 10/1999 | Weiler | G01R 29/08 455/67.13 |
| 6,269,243 | B1 * | 7/2001 | Corbefin | H04B 7/18504 455/427 |
| 2004/0008253 | A1 * | 1/2004 | Monroe | G08B 13/19641 348/143 |
| 2005/0256616 | A1 * | 11/2005 | Rhoads | H04L 67/06 701/1 |
| 2006/0179457 | A1 * | 8/2006 | Brady, Jr. | A63F 13/12 725/76 |
| 2008/0090567 | A1 * | 4/2008 | Gilbert | H04B 7/18506 455/431 |
| 2009/0109223 | A1 * | 4/2009 | Schalla | B64D 11/0015 345/427 |

(Continued)

FOREIGN PATENT DOCUMENTS

WO   WO 2010/130992   11/2010

OTHER PUBLICATIONS

European Search Report for Application No. 13 19 0512 dated May 30, 2014.

Primary Examiner — Timothy Pham
(74) Attorney, Agent, or Firm — Jenkins, Wilson, Taylor & Hunt, P.A.

(57) ABSTRACT

An aircraft server system includes a wireless transceiver configured to wirelessly emit and receive radio frequency signals in the passenger cabin of an aircraft, and a plurality of virtual network server units, each configured to remotely control one or more virtual network clients on one of a plurality of personal electronic devices, PEDs, wirelessly connected to the aircraft server system.

11 Claims, 1 Drawing Sheet

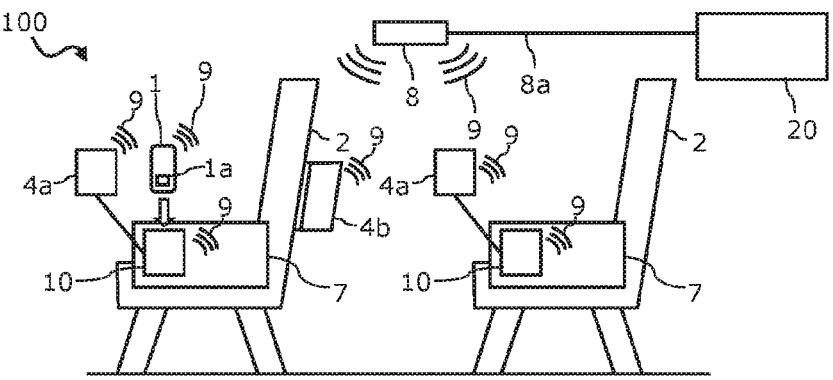

100 – passenger cabin
1 – PED
1a – NFC unit
2 – seat
7 – armrest
8 – network device
8a – network line
9 – radio communication
10 – communication module
20 – server system

(56) References Cited

U.S. PATENT DOCUMENTS

| | | | |
|---|---|---|---|
| 2009/0112377 A1* | 4/2009 | Schalla | B64D 11/0015 |
| | | | 701/3 |
| 2010/0106870 A1 | 4/2010 | Saugnac | |
| 2011/0143835 A1* | 6/2011 | Sizelove | A63F 13/12 |
| | | | 463/31 |
| 2011/0314489 A1 | 12/2011 | Keen et al. | |
| 2013/0149999 A1 | 6/2013 | Lee | |
| 2013/0232237 A1* | 9/2013 | Zulch, III | H04B 7/18506 |
| | | | 709/220 |
| 2014/0094143 A1* | 4/2014 | Ayotte | G06Q 50/18 |
| | | | 455/411 |

\* cited by examiner

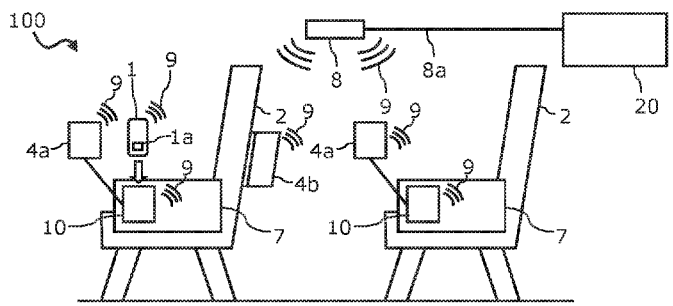

Fig. 1

100 – passenger cabin
1 – PED
1a – NFC unit
2 – seat
7 – armrest
8 – network device
8a – network line
9 – radio communication
10 – communication module
20 – server system

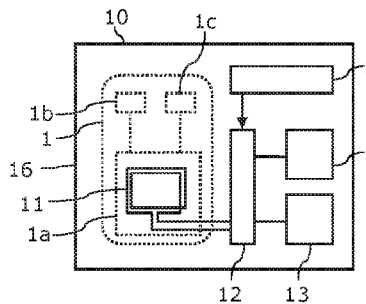 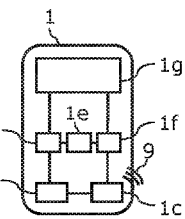

Fig. 2  Fig. 3

11 – inductive energy transfer unit
12 – transfer driver
13 – communication processor
14 – charging processor
15 – control processor
16 – receptacle 1b – battery
1c – wireless communication unit
1d – OS
1e – virtual network client
1f – communication application
1g – display

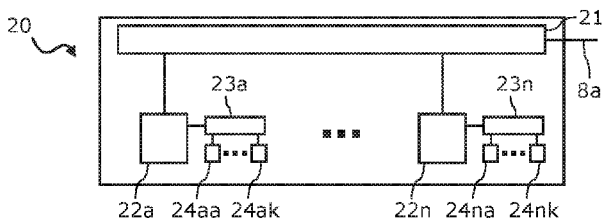

Fig. 4

21 – wireless transceiver
22 – virtual network server units
23 – virtual user profiles
24 – virtual desktops

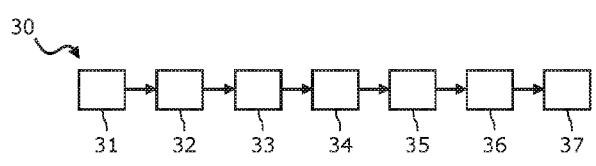

Fig. 5

30 – method
31 – initiate wireless communication
32 – instantiate virtual network client
33 – remote control to VNC
34 – remote control to PEDs
35 – remote input signals
36 – remote control to seats
37 – remote input signals

US 9,986,037 B2

METHOD AND AIRCRAFT SERVER SYSTEM FOR COMMUNICATION WITH A PERSONAL ELECTRONIC DEVICE IN AN AIRCRAFT

CROSS-REFERENCE TO RELATED APPLICATION

This application claims the benefit of and priority to European Patent Application No. 13 190 512.7 filed Oct. 28, 2013, the entire disclosure of which is incorporated by reference herein.

TECHNICAL FIELD

The present disclosure pertains to a method and an aircraft server system for communication with a personal electronic device in an aircraft, in particular by utilizing virtual network computing.

BACKGROUND

Personal electronic devices (PEDs) become increasingly widespread. Usually those PEDs get carried around along with the user wherever he travels, including on board of aircraft. Considering the manifold communication interfaces which such PEDs comprise it is desirable to provide passengers on board an aircraft with access to the different networks of the aircraft, for example a wireless local area network (WLAN).

PEDs often incorporate near field communication (NFC) circuitry comprising NFC chips and corresponding antennas. NFC is a wireless technology allowing two NFC-enabled devices to wirelessly communicate over a short distance of several centimeters. NFC is standardized internationally within NFC Forum specifications and defined in, for example, ISO/IEC 18092, ISO/IEC 18000-3, ISO/IEC 21481, ECMA-340, ISO 14443, and the like. A main application area for NFC technology is contactless, short-range communications on the basis of radio frequency identification (RFID) standards. NFC utilizes electromagnetic field induction that enables communication between PEDs such as laptops, mobile phones, smartphones, tablet PCs and the like.

US 2010/0106870 A1 discloses an aircraft communication system including an aircraft terminal connected to at least one input/output unit. The system includes a portable resource connected to the aircraft terminal via a network connection. The portable resource is equipped with a virtual network server which enables the portable resource to run a virtual network client on the aircraft terminal.

SUMMARY

It is one idea of the disclosure herein to facilitate coupling of aircraft passengers' PEDs to various interfaces of an aircraft while improving the security of the aircraft systems against intrusion from outside.

Accordingly, an aircraft server system is provided, comprising a wireless transceiver configured to wirelessly emit and receive radio frequency signals in the passenger cabin of an aircraft, and a plurality of virtual network server units, each configured to remotely control one or more virtual network clients on one of a plurality of personal electronic devices, PEDs, wirelessly connected to the aircraft server system.

Accordingly, an aircraft communication system is provided, comprising an aircraft server system according to the disclosure, and a plurality of communication modules for engaging in near field communication, NFC, with one of a plurality of PEDs. Each communication module comprises an inductive energy transfer unit, a transfer driver coupled to the inductive energy transfer unit and configured to generate driver signals for operating the inductive energy transfer unit, and a communication processor coupled to the transfer driver and configured to control the inductive energy transfer unit to operate in an NFC operation mode.

Accordingly, a method for providing communication between a PED and an aircraft server system of an aircraft is provided, the method comprising initiating wireless communication between the PED and a network access point of the aircraft, instantiating a virtual network client on the PED by a virtual network server unit of the aircraft server system, and remotely controlling the virtual network client on the PED by the virtual network server unit.

One idea of the present disclosure is to provide wireless access to aircraft interfaces of a wireless aircraft network for personal electronic devices aboard an aircraft. In order to achieve safe and easy access, each personal electronic device may be tied to a virtual network server within the aircraft server system, the virtual network servers hosting remote virtual clients on the respective personal electronic device. The virtual clients may then be remotely controlled by the virtual network servers, so that access to the network and/or the contents and resources of the network may be enabled for the user of the personal electronic device.

The virtual network computing approach allows access control to reside on the server side of the aircraft, preventing or at least impeding any malicious or otherwise corruptive manipulation of the aircraft network by external electronic equipment wirelessly connected to the aircraft network.

According to an embodiment of the aircraft server system, the virtual network server units may be configured to send remote control signals via the wireless transceiver to the respective PEDs, the remote control signals being configured to control the graphical display of a desktop on a display of the PEDs. In one aspect, the virtual network server units may be configured to receive remote input signals via the wireless transceiver from the respective PEDs, the remote input signals being configured to interact with items of the graphical display of the desktop. This allows a graphical interface to be displayed on the PED of a user facilitating access to contents of the aircraft server system. Advantageously, the aircraft server system may be a flight entertainment or passenger services system, so that a user may access media content, passenger services or similar electronic passenger commodities of the aircraft on his PED.

According to a further aspect of the aircraft server system, the virtual network server units can be configured to send remote control signals via the wireless transceiver to a seat display installed in the aircraft, the remote control signals being configured to control the graphical display of a desktop on the seat display. In one aspect, the virtual network server units can be configured to receive remote input signals via the wireless transceiver from the respective seat displays, the remote input signals being configured to interact with items of the graphical display of the desktop on the seat display. This is advantageous if the user of a PED is provided with fixedly installed media equipment at his seat in the aircraft, for example when watching movies on a possibly bigger display of the aircraft media equipment. The desktops of the seat display and the display of the PED may be interlinked so that graphical content provided by the virtual network server units may be easily shifted between the two desktops.

According to an embodiment of the aircraft communication system, the communication processor is further configured to access a wireless communication unit of the PED via NFC. Near field communication, NFC, is particularly useful for initially communicating with the PED and setting up a wireless connection between the PED and the aircraft server system, since with NFC a wireless connection may be set up irrespective of the current operation mode of the PED, such as active operation or stand-by mode.

In one aspect the aircraft communication system can further comprise one or more seat displays arranged in the vicinity of a respective one of the plurality of communication modules, wherein the virtual network server units of the aircraft server system are configured to send remote control signals via the wireless transceiver to a seat display installed in the aircraft, the remote control signals being configured to control the graphical display of a desktop on the seat display.

In one aspect of the method, the method can further comprise wirelessly sending, by the virtual network server unit, remote control signals to the respective PEDs, the remote control signals being configured to control the graphical display of a desktop on a display of the PEDs.

According to a further aspect of the method, the method can further comprise wirelessly receiving, by the virtual network server unit, remote input signals from the respective PEDs, the remote input signals being configured to interact with items of the graphical display of the desktop.

According to an aspect of the method, the method can further comprise wirelessly sending, by the virtual network server unit, remote control signals to a seat display installed in the aircraft, the remote control signals being configured to control the graphical display of a desktop on the seat display.

According to a further aspect of the method, the method can further comprise wirelessly receiving, by the virtual network server unit, remote input signals from the respective seat displays, the remote input signals being configured to interact with items of the graphical display of the desktop on the seat display.

BRIEF DESCRIPTION OF THE DRAWINGS

The disclosure will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

FIG. 1 schematically illustrates a portion of the passenger cabin within an aircraft having seats with a communication module according to an embodiment of the disclosure.

FIG. 2 schematically illustrates a communication module according to a further embodiment of the disclosure.

FIG. 3 schematically illustrates a PED according to a further embodiment of the disclosure.

FIG. 4 schematically illustrates an aircraft server system according to a further embodiment of the disclosure.

FIG. 5 schematically illustrates a method for providing communication between a PED and an aircraft server system according to a further embodiment of the disclosure.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Personal electronic devices (PEDs) within the meaning of the present disclosure comprise at least all electronic devices which may be employed for entertainment, communication and/or office purposes. For example, PEDs may comprise all sorts of end terminals, such as laptops, mobile phones, smartphones, handheld devices, palmtops, tablet PCs, GPS device, navigation devices, audio devices such as MP3 players, portable DVD or BLURAY® players or digital cameras.

Near Field Communication (NFC) within the meaning of the present disclosure includes at least any type or kind of contactless communication between two communication terminals which may be located in the vicinity with respect to each other and which may be able to temporarily exchange information or data by a predefined communication protocol. For example, the spatial distance between the communication terminals which enables the exchange of information or data may be in the range of several centimeters, such as less than 15 cm, in particular, less than 10 cm, more particularly less than 5 cm. NFC within the meaning of the present disclosure may be imparted to the communication terminals by RFID chips, transceiver antennae, transceiver solenoids or similar transmission/reception components. For example, NFC may be conveyed between an actively connecting component and a passive component or between two actively connecting components, i.e. in a so-called peer-to-peer operating mode.

Seats within the meaning of the present disclosure may comprise at least any form of structural components intended to host a passenger for the duration of a flight of an aircraft, the seat being a location which may be used personally and at least temporarily exclusively by the passenger of the aircraft during the flight. Seats within the meaning of the disclosure may be aircraft seats, but also loungers, armchairs, beds, suites of the first or royal class or similar seating furniture within an aircraft.

DETAILED DESCRIPTION

FIG. 1 schematically shows an illustration of a part of a passenger cabin 100 in an aircraft with multiple seats 2. Each of the seats 2 may comprise armrests 7 at which a communication module 10 may be arranged. The armrests 7 may for example comprise a hinge to hingedly affix the communication module thereto. The communication module 10 may comprise a tray or receptacle that may be arranged to swing open around the hinge and to allow placement of a PED 1 therein. After closing the tray or receptacle the PED 1 may be put into a charging and communicating position with respect to the active components within the communication module 10. Of course, it may also be possible to arrange the communication module 10 at a different position at the seat 2 or in the vicinity around the seat 2. For example, the communication module 10 may also be integrated into a tray table of a back rest of a seat 2.

The PED 1 may for example comprise a Near Field Communication unit 1a, NFC unit, which may be arranged near to a NFC solenoid within the communication module 10 when the PED 1 is properly placed into the tray or receptacle of the communication module 10.

The PED 1 may also be in radio communication 9 with a wireless network of the aircraft. The wireless network may, for example, be accessible via a network device 8 such as a router, an access point or similar and a corresponding network line 8a. The wireless network may for example be a WiFi network, a wireless local area, WLAN, network, a UMTS network, a GSM network, a WiMax network, a ZigBee network, an Ethernet network or any similar suitable network type for wireless radio communication. Passengers connected to the wireless network of the aircraft may for example use network functions via their PED 1 such as in-flight entertainment (IFE) functions, email access, internet access or wireless control functionality of facilities in the aircraft such as calling a steward, ordering items of the aircraft shop, remotely adjusting the seat or the like.

The communication modules 10 may each be connected via a connection line, or alternatively wirelessly, to a central control unit which may for example be arranged in the cabin floor, a galley device or any similar suitable place within the aircraft. The central control unit may be equipped with a power line to draw power from aircraft internal power sources, such as a 28 VDC power network of the aircraft, and distribute it to the individual communication modules 10. The central control unit may also comprise a data line by which control signals, configuration data or data signals may be provided to and from the individual communication modules 10.

It may also be possible to use a system for contactless data and power transmission between the communication module 10 and a contactless supply system under the passenger cabin floor. The communication module 10 may in this case comprise a first control unit with a voltage input port. The contactless supply system may similarly include a second control unit with a voltage output port. A transducer may be implemented with a primary winding in a first core in the communication module 10 and a secondary winding in a second core within the supply system. The second control unit may provide a voltage at the voltage output port, which voltage may be transferred to the communication module 10 by contactless energy transfer via the transducer.

Using the same contact less transfer mechanism, data and control signals may be transferred as well, for example via frequency-modulated alternating voltages with the data and control signals being translated into the frequency modulation. Accordingly, by way of using a transducer with a primary winding and a secondary winding, a simultaneous complete transmission of electrical power and of data may be achieved without the need to use a multitude of electromagnetic transducers. Such systems for the modulation and demodulation of data may provide sufficiently robust and cost-effective control of modulation and demodulation.

FIG. 2 shows a schematic illustration of a communication module 10, for example a communication module 10 as being utilized in the passenger cabin 100 of an aircraft shown and explained with respect to FIG. 1.

A PED 1—shown in dashed lines to indicate that it is accommodated within the tray or receptacle 16 of the communication module 10—may comprise a NFC unit 1a, a battery 1b and a wireless communication unit 1c. The wireless communication unit 1c may for example be an Ethernet network card, a Bluetooth® device, a Firewire interface terminal, a serial interface terminal or any other interface device with which the PED 1 may establish a communication with external devices according to a given communication protocol.

The PED 1 may be arranged within the receptacle 16 so that the NFC unit 1a is placed in vicinity of an inductive energy transfer unit 11 of the communication module 10. The inductive energy transfer unit 11 may for example be a solenoid or a coil 11. The communication module 10 may be configured to perform inductive power coupling to allow energy to be transferred from a power supply of the communication module 10 to the battery 1b of the PED 1 without the need for a wire-bound connection there between. Across the inductive energy transfer unit 11 an oscillating electric potential may be applied which sets up an oscillating magnetic field in the vicinity of the solenoid 11. The oscillating magnetic field may induce a secondary oscillating electrical potential in a coil within the NFC unit 1c placed close to the inductive energy transfer unit 11, thereby transmitting electrical energy from the inductive energy transfer unit 11 to the NFC unit 1c by electromagnetic induction without a conductive connection between the solenoid 11 and the coil of the NFC unit 1c. The inductive energy transfer unit 11 may be adapted to generate an electromagnetic field suitable to induce a current in a coil of the NFC unit 1a.

The inductive energy transfer unit 11 may be driven by a transfer driver 12 which in turn may be controlled by a charging processor 14. The charging processor 14 may be adapted to control the charging functionality of the inductive energy transfer unit 11 by issuing respective control signals to the transfer driver 12. For example, the charging processor 14 may be adapted to communicate with the PED 1 according to the Qi standard to initiate a wireless charging process.

At the same time, the transfer driver 12 may also be controlled by a communication processor 13 which may facilitate near-field communication of the communication module 10 with the PED 1. It may be possible for the communication processor to be implemented as system-on-chip (SoC) component including a computing processor and a memory element. It may also be possible to implement the communication processor as application-specific integrated circuit (ASIC), field-programmable gate array (FPGA), programmed logic device (PLD) or any other suitable electronic circuitry.

The communication module 10 may further include a control processor 15 which may be coupled to the transfer driver 12 and which may be adapted to control whether the transfer driver 12 is to be driven in charging mode, i.e. under the control of the charging processor 14, or in communication mode, i.e. under control of the communication processor 12. The control processor 15 may be a microcontroller, a FPGA, an ASIC, a PLD or any similar electronic circuitry configured to detect in which operating mode the transfer driver 12 should be operated.

The communication modules 10 may each be assigned to a specific one of the seats 2 in FIG. 1. In particular, each of the seats 2 may be equipped with a communication module 10. The allocation of seats to communication modules 10 may be predetermined when installing the communication modules 10 and hardcoded into one or more of the processors of the communication modules 10. It is also possible to dynamically allocate a seat 2 to one of the communication modules 10 by the central control unit.

The PED 1 may be identified with the communication module 10 and be assigned an access code or authentication for the wireless network 8 at the same as the PED 1 initiates communication with the communication module 10 via NFC. In particular, the wireless network connection to the PED 1 may already be set up by the communication processor 13 which may access the respective network component in the PED 1 via the inductive energy transfer unit 11 and the NFC unit 1*a*.

It may also be possible for the PED 1 to access the network device 8 via wireless communication directly and set up a wireless network link without the need for a communication module 10. In that case, the PED 1 may utilize the wireless communication unit 1*c* to establish the wireless network link with the wireless network of the aircraft according to a given communication protocol, such as one of the IEEE 802.11 standards.

The assignment of the wireless network connection for the PED 1 may in particular be seat-bound via the allocation of the respective network-enabling communication module 10 to one of the seats 2. The wireless network connection may then be used, for example, to stream video content from the in-flight entertainment service (IFE) on the PED 1 or to gain access to the cabin intercommunication system (CIDS) of the aircraft.

FIG. 3 schematically illustrates a personal electronic device 1, PED, which may for example be used in the system of FIG. 1 and for interaction with the communication module 10 of FIG. 2.

The PED 1 comprises the NFC unit 1*a* as well as the wireless communication unit 1*c*. The NFC unit 1*a* may be controlled by the operating system 1*d* of the PED 1, such as Windows®, Unix®, Linux®, Android®, iOS® or any other suitable operating system. The wireless communication unit 1*c* may be accessible by a communication application 1*f* of the PED 1, such as a web browser, an email client, a media streaming application or any other type of software application installed on the PED 1. The PED 1 may further comprise a display 1*g*, such as a graphical touchscreen.

A virtual network client 1*e* may be instantiated on the PED 1 by a virtual network server of the aircraft server system 20 after the PED 1 has been wirelessly connected to the aircraft network. The virtual network client 1*e* may be coupled to the communication application if and provide a virtual network computing address to gain access to content of the aircraft server system 20, such as media content (for example movies, audio files or images), online shopping catalogues, email provider services, Internet applications or any similar content.

FIG. 4 schematically illustrates an aircraft server system 20 which may be used in the passenger cabin 100 in an aircraft communication system of FIG. 1. The aircraft server system 20 comprises a wireless transceiver 21 which is configured to wirelessly emit and receive radio frequency signals in the passenger cabin 100 of the aircraft. The radio frequency signals may be transmitted via a network line 8*a* to the various network devices 8 of the network for transmission and reception in the passenger cabin 100.

The aircraft server system 20 further comprises a plurality of virtual network server units 22*a* to 22*n*. Exemplarily, only two virtual network server units 22*a* and 22*n* are shown, however, it should be obvious to the skilled person in the art that any given number of virtual network server units may equally be implemented in the aircraft server system 20. Each of the virtual network server units 22*a* and 22*n* is configured to remotely control one or more of the virtual network clients 1*e* on one of a plurality of PEDs 1 which are wirelessly connected to the aircraft server system 20. For each virtual network server unit 22*a* to 22*n* a virtual user profile 23*a* to 23*n* may be generated and each of the virtual user profiles 23*a* to 23*n* may be instantiated with one or more virtual desktops 24*aa*, 24*ak*, 24*na*, 24*nk*. The number of virtual desktops 24*aa*, 24*ak*, 24*na*, 24*nk* is exemplarily shown as two per virtual user profile 23*a* to 23*n*, however, it should be obvious to the skilled person in the art that any given number of virtual desktops may equally be implemented in the aircraft server system 20.

One of the virtual desktops may be employed for graphical display on the display 1*g* of the respectively hosted PED 1, while another one of the virtual desktops may be employed for graphical display on one of the seat displays 4*a*, 4*b* in FIG. 1. The virtual network server units 22*a*, 22*n* are configured to send remote control signals via the wireless transceiver 21 to the respective PEDs 1, the remote control signals being configured to control the graphical display of the virtual desktops on the PEDs 1 or the seat displays 4*a*, 4*b*. Analogously, the virtual network server units 22*a*, 22*n* may be configured to receive remote input signals via the wireless transceiver 21 from the respective PEDs 1 or the seat displays 4*a*, 4*b*, the remote input signals being configured to interact with items of the graphical display of the virtual desktop. For example, it may be possible for the user of the PED 1 and/or the seat display 4*a*, 4*b* to generate input signals by touching the respective display, pressing buttons on the PED 1 or the seat display 4*a*, 4*b* or using other input devices such as a mouse, a keyboard, a voice activated input module or similar input devices configured to generated control signals.

The virtual network server units 22*a*, 22*n* may for example employ a remote frame buffer, RFB, protocol or a remote desktop protocol, RDP, to communicate with the virtual network client 1*e* and/or the seat displays 4*a*, 4*b*. The virtual network server units 22*a*, 22*n* may operate platform-independent, i.e. the virtual network server units 22*a*, 22*n* may instantiate virtual network clients 1*e* on any PED 1 irrespective of the type of operating system 1*d* employed on the PED 1.

FIG. 5 shows a schematic illustration of a method 30 for communication with a personal electronic device, PED, in an aircraft, in particular utilizing, an aircraft server system 20, a communication module 10 and a PED 1 as shown in FIGS. 1 to 4.

The method 30 can comprise as a first step 31 initiating wireless communication between the PED 1 and a network access point 8 of the aircraft. In a second step a virtual network client 1*e* may be instantiated on the PED 1 by a virtual network server unit 22*a*, 22*n* of an aircraft server system 20. Finally, in a third step 33 the virtual network client 1*e* on the PED 1 may be remotely controlled by the virtual network server unit 22*a*, 22*n*.

Optionally, the method 30 may further comprise, such as a step 34, wirelessly sending, by the virtual network server unit 22*a*, 22*n*, remote control signals to the respective PEDs 1, the remote control signals being configured to control the graphical display of a desktop on a display 1*g* of the PEDs 1. Furthermore, the method 30 may comprise a step 35 of wirelessly receiving, by the virtual network server unit 22*a*, 22*n*, remote input signals from the respective PEDs 1, the remote input signals being configured to interact with items of the graphical display 1g of the desktop.

Similarly, the method 30 may optionally comprise a step 36 of wirelessly sending, by the virtual network server unit 22a, 22n, remote control signals to a seat display 4a, 4b installed in the aircraft, the remote control signals being configured to control the graphical display of a desktop on the seat display 4a, 4b. Particularly, in a step 37 the method 30 may optionally comprise wirelessly receiving, by the virtual network server unit 22a, 22n, remote input signals from the respective seat displays 4a, 4b, the remote input signals being configured to interact with items of the graphical display of the desktop on the seat display 4a; 4b.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the disclosure and the method according to the disclosure, and vice versa.

The embodiments were chosen and described in order to best explain the principles of the disclosure and its practical applications, to thereby enable others skilled in the art to best utilize the disclosure and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. An aircraft server system, comprising:
   a wireless transceiver configured to wirelessly emit and receive radio frequency signals in the passenger cabin of an aircraft; and
   a plurality of virtual network server units, each configured to remotely control one or more virtual network clients on one of a plurality of personal electronic devices, PEDs, wirelessly connected to the aircraft server system,
   wherein the virtual network server units are configured to send remote control signals via the wireless transceiver to the respective PEDs, the remote control signals being configured to control the graphical display of a desktop on a display of the PEDs.

2. The aircraft server system according to claim 1, wherein the virtual network server units are configured to receive remote input signals via the wireless transceiver from the respective PEDs, the remote input signals being configured to interact with items of the graphical display of the desktop.

3. The aircraft server system according to claim 1, wherein the virtual network server units are configured to send remote control signals via the wireless transceiver to a seat display installed in the aircraft, the remote control signals being configured to control the graphical display of a desktop on the seat display.

4. The aircraft server system according to claim 3, wherein the virtual network server units are configured to receive remote input signals via the wireless transceiver from the respective seat displays, the remote input signals being configured to interact with items of the graphical display of the desktop on the seat display.

5. The aircraft server system according to claim 1, comprising:
   a plurality of communication modules for engaging in near field communication, NFC, with one of a plurality of PEDs, each communication module comprising:
      an inductive energy transfer unit,
      a transfer driver coupled to the inductive energy transfer unit and configured to generate driver signals for operating the inductive energy transfer unit, and
      a communication processor coupled to the transfer driver and configured to control the inductive energy transfer unit to operate in an NFC operation mode.

6. The aircraft server system according to claim 5, wherein the communication processor is further configured to access a wireless communication unit of the PED via NFC.

7. The aircraft server system according to claim 6, further comprising:
   one or more seat displays arranged in the vicinity of a respective one of the plurality of communication modules, wherein the virtual network server units of the aircraft server system are configured to send remote control signals via the wireless transceiver to a seat display installed in the aircraft, the remote control signals being configured to control the graphical display of a desktop on the seat display.

8. A method for providing communication between a personal electronic device, PED, and an aircraft server system of an aircraft, the method comprising:
   initiating wireless communication between the PED and a network access point of the aircraft;
   instantiating a virtual network client on the PED by a virtual network server unit of the aircraft server system;
   remotely controlling the virtual network client on the PED by the virtual network server unit; and
   wirelessly sending, by the virtual network server unit, remote control signals to the respective PEDs, the remote control signals being configured to control the graphical display of a desktop on a display of the PEDs.

9. The method according to claim 8, further comprising: wirelessly receiving, by the virtual network server unit, remote input signals from the respective PEDs, the remote input signals being configured to interact with items of the graphical display of the desktop.

10. The method according to claim 8, further comprising:
   wirelessly sending, by the virtual network server unit, remote control signals to a seat display installed in the aircraft, the remote control signals being configured to control the graphical display of a desktop on the seat display.

11. The method according to claim 10, further comprising:
   wirelessly receiving, by the virtual network server unit, remote input signals from the respective seat displays, the remote input signals being configured to interact with items of the graphical display of the desktop on the seat display.

* * * * *